(12) United States Patent
Wang et al.

(10) Patent No.: US 11,375,422 B2
(45) Date of Patent: *Jun. 28, 2022

(54) UE COMMUNICATION HANDOVER BETWEEN LIGHT FIDELITY ACCESS POINTS IN A COMMUNICATION SYSTEM

(71) Applicant: Telefonaktiebolaget LM Ericsson (publ), Stockholm (SE)

(72) Inventors: Keven Wang, Sollentuna (SE); Hongxin Liang, Upplands Väsby (SE); Nicolas Seyvet, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,279

(22) Filed: Dec. 10, 2020

(65) Prior Publication Data
US 2021/0092659 A1  Mar. 25, 2021

Related U.S. Application Data

(63) Continuation of application No. 16/347,252, filed as application No. PCT/EP2016/081559 on Dec. 16, 2016, now Pat. No. 10,893,451.

(51) Int. Cl.
*H04W 36/08* (2009.01)
*H04B 10/114* (2013.01)
(Continued)

(52) U.S. Cl.
CPC .......... *H04W 36/08* (2013.01); *H04B 10/116* (2013.01); *H04B 10/1143* (2013.01); *H04W 24/10* (2013.01); *H04W 36/30* (2013.01)

(58) Field of Classification Search
CPC ..... H04W 36/08; H04W 24/10; H04W 36/30; H04B 10/1143; H04B 10/116; H04B 10/1149
See application file for complete search history.

(56) References Cited

U.S. PATENT DOCUMENTS 9,461,739 B2 * 10/2016 Liu .................... H04B 10/1149
2011/0064405 A1 * 3/2011 Rajagopal ............ H04B 10/116
398/43

(Continued)

FOREIGN PATENT DOCUMENTS

CN   105451288 B  * 10/2018
EP   2750444 A1    7/2014
(Continued)

OTHER PUBLICATIONS

International Search Report and Written Opinion of the International Searching Authority for PCT International Application No. PCT/EP2016/081559 dated Feb. 9, 2017, 10 pages.

*Primary Examiner* — Jay P Patel
(74) *Attorney, Agent, or Firm* — Sage Patent Group

(57) ABSTRACT

A method by a coordination node is provided for controlling communications between Li-Fi APs and UEs. The method includes receiving peer connectivity reports from Li-Fi APs which identify Li-Fi APs having at least partially overlapping coverage areas, and developing a handover pathway data structure, based on the peer connectivity reports, that identifies Li-Fi APs that can receive communication handover from other identified Li-Fi APs. The method further includes determining an identifier of a first Li-Fi AP providing Li-Fi communication service for a UE, and accessing the handover pathway data structure using the identifier of the first Li-Fi AP to determine an identifier of a second Li-Fi AP to which handover from the first Li-Fi AP can be performed. The method then initiates handover of the Li-Fi communication service for the UE from the first Li-Fi AP to the second Li-Fi AP.

19 Claims, 8 Drawing Sheets

(51) Int. Cl.
*H04B 10/116* (2013.01)
*H04W 24/10* (2009.01)
*H04W 36/30* (2009.01)

(56) References Cited

U.S. PATENT DOCUMENTS

| | | |
|---|---|---|
| 2011/0069962 A1* | 3/2011 | Castor .................. H05B 47/195 |
| | | 398/115 |
| 2014/0050487 A1* | 2/2014 | Liu ........................ H04L 5/0007 |
| | | 398/127 |
| 2017/0245311 A1 | 8/2017 | Murray et al. |
| 2017/0251365 A1 | 8/2017 | Burchardt et al. |
| 2017/0265112 A1 | 9/2017 | Morita et al. |
| 2018/0007587 A1 | 1/2018 | Feldman et al. |
| 2020/0128646 A1 | 4/2020 | Sinha et al. |

FOREIGN PATENT DOCUMENTS

| | | | | |
|---|---|---|---|---|
| EP | 2953277 | A1 | 12/2015 | |
| EP | 35566137 | A1 | 3/2020 | |
| WO | WO-2011113385 | A2 * | 9/2011 | ......... H04B 10/1125 |
| WO | 2014/085128 | A1 | 6/2014 | |
| WO | WO-2016038353 | A1 * | 3/2016 | ........... H04L 63/107 |
| WO | 2016/059082 | A1 | 4/2016 | |
| WO | 2017/017265 | A1 | 2/2017 | |
| WO | 2018/108294 | A1 | 6/2018 | |

* cited by examiner

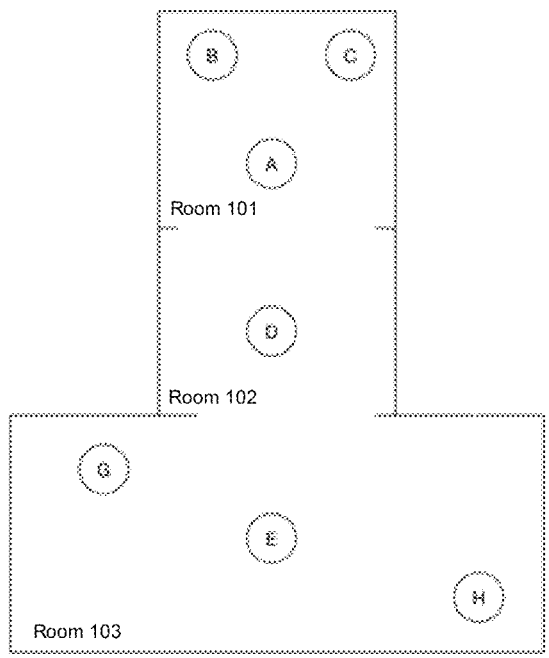 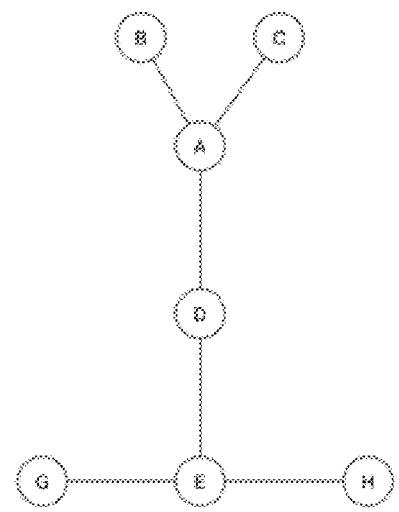
FIG. 3a                FIG. 3b
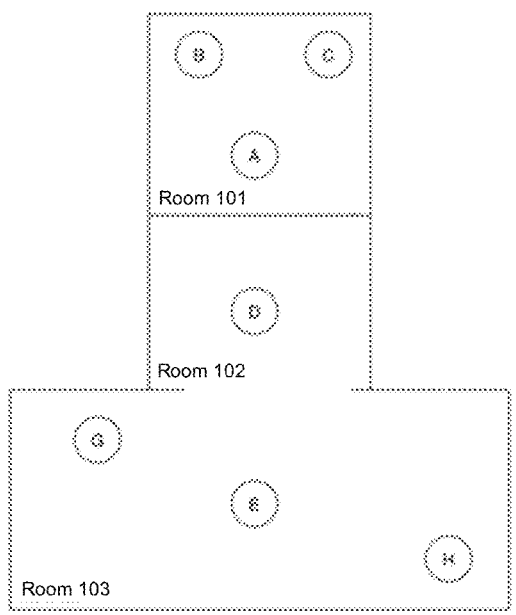 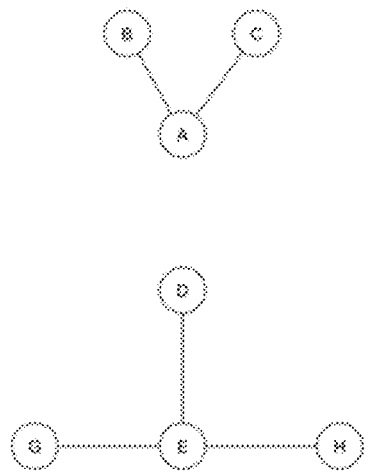
FIG. 4a                FIG. 4b

UE COMMUNICATION HANDOVER BETWEEN LIGHT FIDELITY ACCESS POINTS IN A COMMUNICATION SYSTEM

CROSS REFERENCE TO RELATED APPLICATION

This application is a continuation of U.S. application Ser. No. 16/347,252 filed on May 3, 2019, which itself is a 35 U.S.C. § 371 national stage application of PCT International Application No. PCT/EP2016/081559 filed on Dec. 16, 2016, the disclosures and contents of which are incorporated by reference herein in their entireties.

TECHNICAL FIELD

The present disclosure relates generally to networking systems and methods and more particularly to Visible Light Communication (Li-Fi) systems and related Access Points (AP).

BACKGROUND

With the explosion of smart phones, tablets, laptops, and other user equipment (UE) both in enterprise (e.g., bring your own device or BYOD) and guest account scenarios, there is an ever increasing demand for wireless bandwidth in high density UE environments. WLAN (also referred to as Wireless Fidelity (WiFi)) has been a primary means of connectivity for UEs. WLAN is generally defined in IEEE 802.11 and variants thereof. The wireless spectrum which is necessary for communication between WiFi/WLAN Access Points (APs) and UEs is becoming increasingly scarce as demand grows exponentially with the proliferation of such devices.

Deploying more WiFi/WLAN Access Points (APs) may not be a right solution because of already high levels of interference from competing devices. Many UEs support communication modes beyond WiFi, including utilizing subscriber services provided by wireless service operators with 3G, 4G Long Term Evolution (LTE), and other communication protocols. Disadvantageously, connectivity through subscriber services can be more costly and/or may provide lower bandwidth than WiFi. Accordingly, there is a need for alternative systems and methods to providing wireless bandwidth in high density UE environments.

Light Fidelity (Li-Fi) communication systems use the visible light portion of the electromagnetic spectrum for communication between APs and UEs. Li-Fi may also be referred to as LiFi (Light WiFi). Li-Fi is an alternative to a radio frequency based communications approach but can also be prone to interference in some environments. Because Li-Fi signals are limited to line-of-sight and cannot penetrate walls and closed doors, communication coverage areas provided by Li-Fi APs depends upon the open space geometry of their rooms and can dynamically change over time as signal blocking objects are remove and inserted. The resulting potentially small and irregular geometric coverage areas complicates technical approaches for providing mobility to users operating Li-Fi UEs.

SUMMARY

Some embodiments disclosed herein are directed to a method by a coordination node for controlling communications between Li-Fi APs and UEs. The method includes receiving peer connectivity reports from Li-Fi APs which identify Li-Fi APs having at least partially overlapping coverage areas, and developing a handover pathway data structure, based on the peer connectivity reports, that identifies Li-Fi APs that can receive communication handover from other identified Li-Fi APs. The method further includes determining an identifier of a first Li-Fi AP providing Li-Fi communication service for a UE, and accessing the handover pathway data structure using the identifier of the first Li-Fi AP to determine an identifier of a second Li-Fi AP to which handover from the first Li-Fi AP can be performed. The method then initiates handover of the Li-Fi communication service for the UE from the first Li-Fi AP to the second Li-Fi AP.

A potential advantage of this approach is that it can provide more efficient and robust management of handover of UE communications between Li-Fi APs. The coordination node can use the peer connectivity reports from the Li-Fi APs to dynamically update a handover pathway data structure to track changes in the handover opportunities between particular ones of the Li-Fi APs, such as when doors become open or closed, when Li-Fi APs become powered on or power off, and/or when other events occur that change the communication capability of one or more of the Li-Fi APs. In view of the relatively small coverage areas provided by individual ones of the Li-Fi APs, developing and using a handover pathway data structure as disclosed herein can enable handover decisions to be quickly made based on the current availability of Li-Fi APs for handover from particular other Li-Fi APs.

Some other related embodiments are directed to a coordination node for controlling communications between Li-Fi APs and UEs. The coordination node includes a receiving module, a handover pathway development module, a determining module, a handover pathway access module and a handover module. The receiving module is for receiving peer connectivity reports from Li-Fi APs which identify Li-Fi APs having at least partially overlapping coverage areas. The handover pathway development module is for developing a handover pathway data structure, based on the peer connectivity reports, that identifies Li-Fi APs that can receive communication handover from other identified Li-Fi APs. The determining module is for determining an identifier of a first Li-Fi AP providing Li-Fi communication service for a UE. The handover pathway access module is for accessing the handover pathway data structure using the identifier of the first Li-Fi AP to determine an identifier of a second Li-Fi AP. The handover module is for initiating handover of the Li-Fi communication service for the UE from the first Li-Fi AP to the second Li-Fi AP.

Some other related embodiments are directed to another coordination node for controlling communications between Li-Fi APs and UEs. The coordination node includes a network interface, a processor coupled to the network interface, and a memory coupled to the processor. The memory stores program code that when executed by the processor causes the processor to perform operations. The operations include receiving peer connectivity reports from Li-Fi APs which identify Li-Fi APs having at least partially overlapping coverage areas. The operations further include developing a handover pathway data structure, based on the peer connectivity reports, that identifies Li-Fi APs that can receive communication handover from other identified Li-Fi APs. The operations further include determining an identifier of a first Li-Fi AP providing Li-Fi communication service for a UE. The operations further include accessing the handover pathway data structure using the identifier of the first Li-Fi AP to determine an identifier of a second Li-Fi AP. The operations further include initiating handover of the Li-Fi communication service for the UE from the first Li-Fi AP to the second Li-Fi AP.

Other methods are directed to a Li-Fi AP for communicating with UEs under control of a coordination node areas. The method includes receiving Li-Fi signals from observed Li-Fi APs, where the Li-Fi signals provide identifiers of the observed Li-Fi APs. The method further includes generating a peer connectivity report containing an identifier of the Li-Fi AP and the identifiers of the observed Li-Fi APs, and reporting the peer connectivity report to the coordination node.

Some other related embodiments are directed to a Li-Fi AP for communicating with UEs under control of a coordination node areas. The Li-Fi AP includes a receiving module for receiving Li-Fi signals from observed Li-Fi APs, where the Li-Fi signals provide identifiers of the observed Li-Fi APs. The Li-Fi AP further includes a report generating module for generating (802) a peer connectivity report containing an identifier of the Li-Fi AP and the identifiers of the observed Li-Fi APs, and a communication module for reporting the peer connectivity report to the coordination node.

Some other related embodiments are directed to a Li-Fi AP for communicating with UEs under control of a coordination node areas, which includes a network interface, a processor coupled to the network interface, and a memory coupled to the processor. The memory stores program code that when executed by the processor causes the processor to perform operations. The operations include receiving Li-Fi signals from observed Li-Fi APs, where the Li-Fi signals provide identifiers of the observed Li-Fi APs. The operations further include generating a peer connectivity report containing an identifier of the Li-Fi AP and the identifiers of the observed Li-Fi APs, and reporting the peer connectivity report to the coordination node.

Other methods, coordination nodes, Li-Fi APs, and computer program products according to embodiments will be or become apparent to one with skill in the art upon review of the following drawings and detailed description. It is intended that all such additional methods, coordination nodes, Li-Fi APs, and computer program products be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 3a illustrates 7 Li-Fi APs spaced apart within 3 rooms which have an open pathway there between through which a user can transport a UE;

FIG. 3b graphically illustrates a handover pathway data structure developed by the coordination node of FIG. 1 for use in controlling handoff of UEs between the 7 Li-Fi APs of FIG. 3a, in accordance with some embodiments of the present disclosure;

FIG. 4a illustrates the 7 Li-Fi APs of FIG. 3a but differs therefrom based on a door being closed between 2 of the adjacent rooms;

FIG. 4b graphically illustrates how the handover pathway data structure is modified to correspond to discovery of an absence of handover connectivity between the now closed-off 2 adjacent rooms, in accordance with some embodiments of the present disclosure;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Li-Fi APs are anticipated to be used predominately indoors where communication coverage areas can overlap in complex ways and where mobility of UEs, such as while a user is walking down a hallway, can complicate the ability of such systems to maintain reliable communication links to such UEs. Embodiments of the present disclosure are directed to improving UE mobility between Li-Fi APs in environments where some of the coverage areas can dynamically change due to, for example, doors opening/closing and individual Li-Fi APs being switched on/off.

Figure 1:
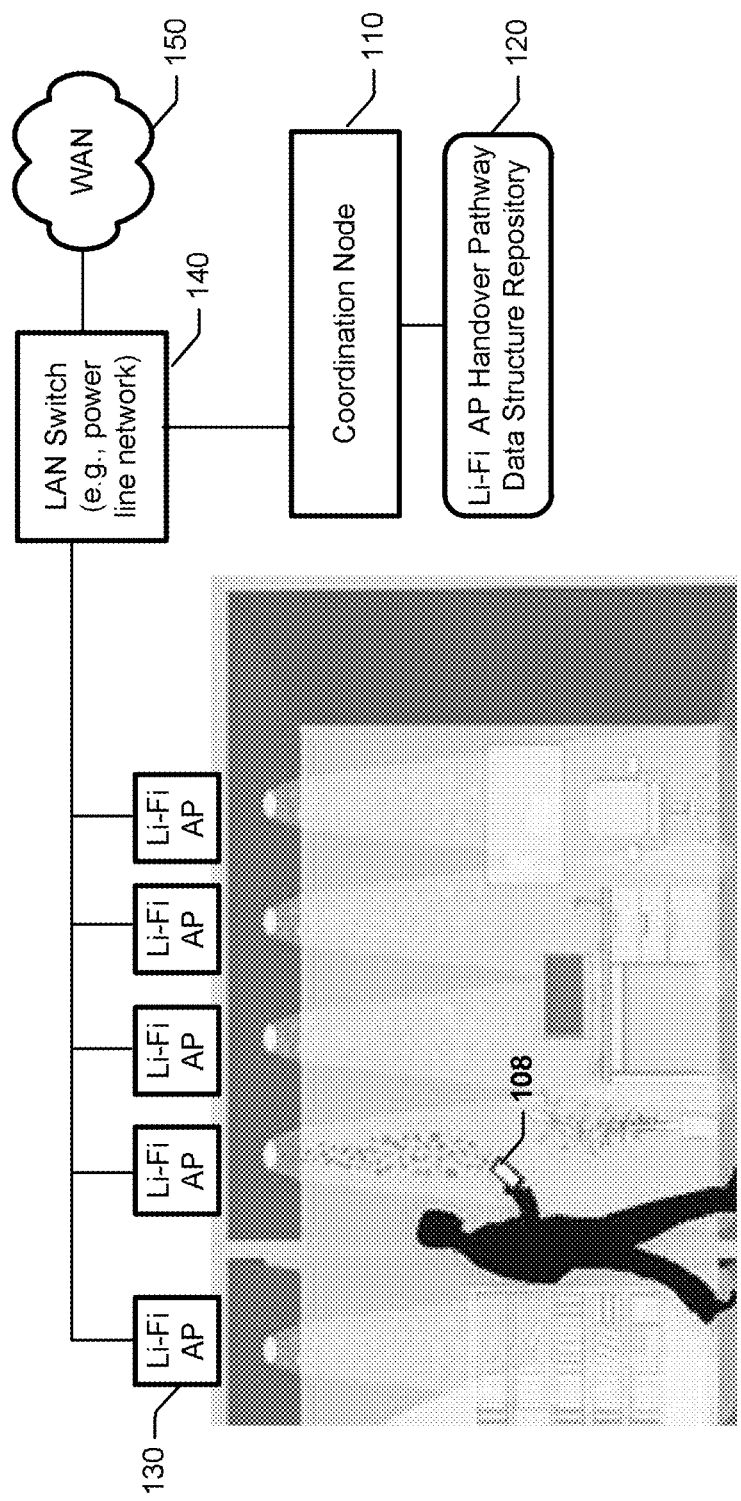
FIG. 1 is a block diagram of a system that includes a coordination node that controls handover of UE communications between Li-Fi APs in accordance with some embodiments of the present disclosure.

FIG. 1 is a block diagram of a system that includes a coordination node 110 that controls handover of UE communications between Li-Fi APs 130 in accordance with some embodiments of the present disclosure. The Li-Fi APs 130 are connected to a wide area network (WAN) 150 through a local area network (LAN) switch 140 via, e.g., a power line network through a common power line, through Wi-Fi wireless RF connection, or other wired/wireless connection. The Li-Fi APs 130 emit Li-Fi signals and receive Li-Fi signals emitted by UEs 108, to provide communication services in their respective coverage areas. The Li-Fi signals may be within the visible light portion of the electromagnetic spectrum and encoded to communicate data between the UEs 108 and Li-Fi APs 130 for routing through, e.g., the local area network (LAN) switch 140 and the wide area network (WAN) 150. In the illustrated example, spatially adjacent Li-Fi APs 130 have partially overlapping or nearly overlapping coverage areas. The coordination node 110 operates to control handover of UE communications between individual ones of the Li-Fi APs 130 to maintain continuous or nearly continuous communication capability as a person carries the UE 108 from the coverage area of one Li-Fi AP 130 into the coverage area of another Li-Fi AP 130.

In accordance with various embodiments, handover between Li-Fi APs 130 can be improved by the coordination node 110 developing a handover pathway data structure which is used for handover of UE communications between the Li-Fi APs 130. The handover pathway data structure can be updated over time to dynamically track changes that occur in the availability of Li-Fi APs 130 for use in UE handover.

The coordination node 110 uses peer connectivity reports received from the Li-Fi APs 130 to develop the handover pathway data structure. Li-Fi APs 130 can generate the peer connectivity reports based on identifying from which, if any, other Li-Fi APs 130 it receives Li-Fi signals. The peer connectivity reports can be generated to contain information identifying the other Li-Fi APs 130. The handover pathway data structure can be retained in memory of a repository 120. Li-Fi APs 130 may periodically share their peer connectivity reports with other observable Li-Fi APs 130 through Li-Fi signaling or other communication signaling therebetween. A Li-Fi AP 130 can use a peer connectivity report from another Li-Fi AP 130 to update its local peer connectivity information, and which it can use to generate the peer connectivity reports.

As will be explained in further detail below, handover between Li-Fi APs 130 can be initiated by the coordination node 110 in response a determination that a communication signal quality measurement, e.g., signal strength and/or bit error rate, has dropped below a defined quality threshold. Comparison of the communication signal quality measurement to the defined quality threshold may be performed by the UE 108 based on a Li-Fi signal received from a Li-Fi AP 130, by the Li-Fi AP 130 based on a Li-Fi signal received from the UE 108, and/or by the coordination node 110 based on receipt of the communication signal quality measurement from the Li-Fi AP 130.

Figure 2:
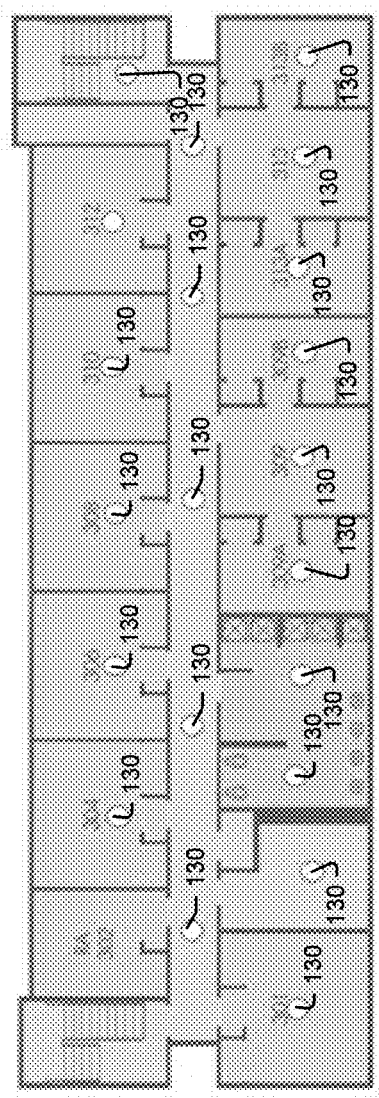
FIG. 2 illustrates Li-Fi APs to provide Li-Fi communication service within a building, and for which a handover pathway data structure is developed by the coordination node of FIG. 1, in accordance with some embodiments of the present disclosure.

FIG. 2 illustrates Li-Fi APs 130 that are spaced apart to provide Li-Fi communication coverage areas in various rooms and hallways within a building. Referring to FIG. 2 it is observed that some of the Li-Fi APs 130 have partially overlapping coverage areas because they can emit and receive Li-Fi signals passing through various door and other openings between the rooms, hallways, stairwells, etc. between adjacent coverage areas. The connection node 110 of FIG. 1 is configured to initiate handover between the Li-Fi APs 130 of ongoing Li-Fi communications with a UE as a person transports the UE throughout the building. The connection node 110 develops a handover pathway data structure for the building, which it uses to carry out initiation of handover.

FIG. 3a illustrates 7 Li-Fi APs (named A-E, G, H) spaced apart within 3 rooms (Rooms 101, 102, 103) which have an open pathway between the adjacent rooms, and through which a user can transport a UE. FIG. 3b graphically illustrates an example handover pathway data structure developed by the coordination node 110 of FIG. 1 for use in controlling handoff of UEs between the 7 Li-Fi APs of FIG. 3a. The example handover pathway data structure contains information identifying that Li-Fi AP (A) can handoff to Li-Fi APs (B), (C), and (D); Li-Fi AP (D) can handoff to Li-Fi APs (A) and (E); and Li-Fi AP (E) can handoff to Li-Fi APs (G) and (H). Thus, for example, when a handover condition becomes satisfied for an ongoing Li-Fi communication service for a UE, e.g., such as when a UE signal quality measurement drops below a quality threshold, the coordination node 110 accesses the handover pathway data structure using the identifier of the current Li-Fi AP to determine an identifier of one or more other Li-Fi APs to which the Li-Fi communication service for the UE can be handed over. The coordination node then initiates handover of the Li-Fi communication service for the UE from the current Li-Fi AP to the identified one or more other Li-Fi APs or to a further selected one of a plurality of the available Li-Fi APs. The quality threshold may correspond to any one or more of: a signal strength threshold, a bit error rate threshold, etc.

Further example operations are now explained in view of the coverage scenario of FIG. 3b. As a UE is transported from the coverage area of Li-Fi AP (A) into the coverage area of Li-Fi AP (B), the signal strength measurements by the UE of Li-Fi signals from the Li-Fi AP (A) will fall below a signal strength threshold. The UE can report the signal strength measurements through one or both of the Li-Fi APs (A) and (B) to the coordination node 110. The coordination node 110 accesses the handover pathway data structure to determine that handover from Li-Fi AP (A) to Li-Fi AP (B), Li-Fi AP (C), and Li-Fi AP (D) is allowed. In one embodiment, the coordination node 110 can initiate handover of the ongoing Li-Fi communication service for the UE from Li-Fi AP (A) to the group of Li-Fi APs (B), (C), and (D). In a further embodiment, the coordination node 110 selects Li-Fi AP (B) as a best candidate among the group of available Li-Fi APs, and responsively initiates handover of the ongoing Li-Fi communication service for the UE from Li-Fi AP (A) to Li-Fi AP (B).

Further related operations are explained in the context of as the UE is transported from the coverage area of Li-Fi AP (A) into the coverage area of Li-Fi AP (D), the UE can report signal strength measurements indicating that Li-Fi signals received from Li-Fi AP (A) have fallen below the signal strength threshold while signal strength measurements of Li-Fi signals received from Li-Fi AP (D) have risen above the signal strength threshold. The reported measurements can trigger the coordination node 110 to determine from the handover pathway data structure that handover from Li-Fi AP (A) to Li-Fi AP (D) is allowed and, responsively, initiate handover of the ongoing Li-Fi communication service for the UE from Li-Fi AP (A) to Li-Fi AP (D).

FIG. 4a illustrates the 7 Li-Fi APs of FIG. 3a but differs therefrom based on a door being closed between adjacent rooms 101 and 102, thereby preventing Li-Fi AP (A) from receiving Li-Fi signals from Li-Fi AP (D) and vice versa. Other events that can cause Li-Fi APs to no longer receive Li-Fi signal from one another, can include becoming powered-off, becoming inoperative to emit Li-Fi signals, becoming inoperative to receive Li-Fi signals, etc. FIG. 4b graphically illustrates how the example handover pathway data structure has been developmentally modified by the coordination node 110 responsive to discovering, through one or more peer connectivity reports received from Li-Fi AP (A) and/or Li-Fi AP (D), that Li-Fi AP (A) can no longer detect Li-Fi signals from Li-Fi AP (D) or vice versa. Information contained in the example handover pathway data structure of FIG. 3b is therefore modified by the coordination node 110 so that Li-Fi AP (A) is no longer indicated in FIG. 4b as having the ability to handoff to Li-Fi AP (D) and vice versa.

Further example operations are explained in view of the coverage scenario of FIG. 4b, as a UE is transported from the coverage area of Li-Fi AP (A) into the coverage area of Li-Fi AP (B), the signal strength measurements by the UE of Li-Fi signals from the Li-Fi AP (A) will fall below a signal strength threshold. The UE can report the signal strength measurements through one or both of the Li-Fi APs (A) and (B) to the coordination node 110. The coordination node 110 accesses the handover pathway data structure and determines that handover from Li-Fi AP (A) to Li-Fi AP (B) and Li-Fi AP (C) is allowed. In one embodiment, the coordination node 110 can initiate handover of the ongoing Li-Fi communication service for the UE from Li-Fi AP (A) to the group of Li-Fi APs (B) and (C). In contrast to the example of FIG. 3b, the coordination node 110 does not initiate handover of the ongoing Li-Fi communication service to the Li-Fi AP (D) because that AP is not indicated to be presently available for handover from Li-Fi AP (A).

In this manner, when a peer connectivity report from a Li-Fi AP 130 indicates that it has received signals from another Li-Fi AP 130, the coordination node 110 determines that the two Li-Fi APs 130 have at least partially overlapping coverage areas and responsively updates the corresponding handover information for those Li-Fi APs 130 in the handover pathway data structure. The coordination node 110 can similarly update the corresponding handover information for those Li-Fi APs 130 in the handover pathway data structure to indicate when those Li-Fi APs 130 are no longer indicated by the peer connectivity reports to be able to receive signals from each other. The coordination node 110 thereby learns over time and updates the handover pathway data structure to indicate which Li-Fi APs 130 have at least partially overlapping communication coverage areas and can be used for performing handover of Li-Fi communication service for UEs.

Figure 5:
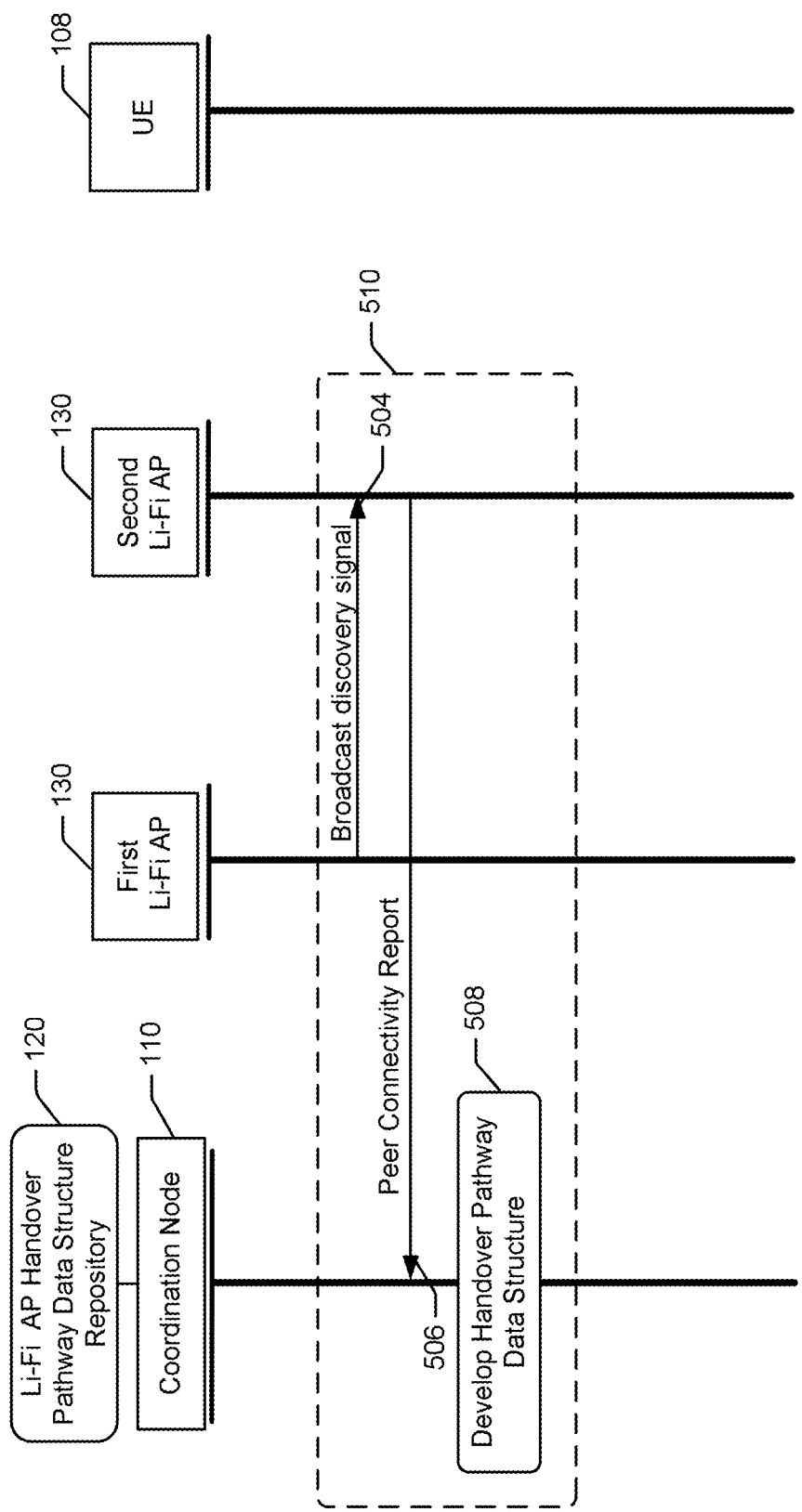
FIG. 5 is a combined data flow diagram and flowchart of operations by two Li-Fi APs to provide peer connectivity reports to the coordination node 110 for development of a handover pathway data structure in accordance with some embodiments of the present disclosure.
Figure 6:
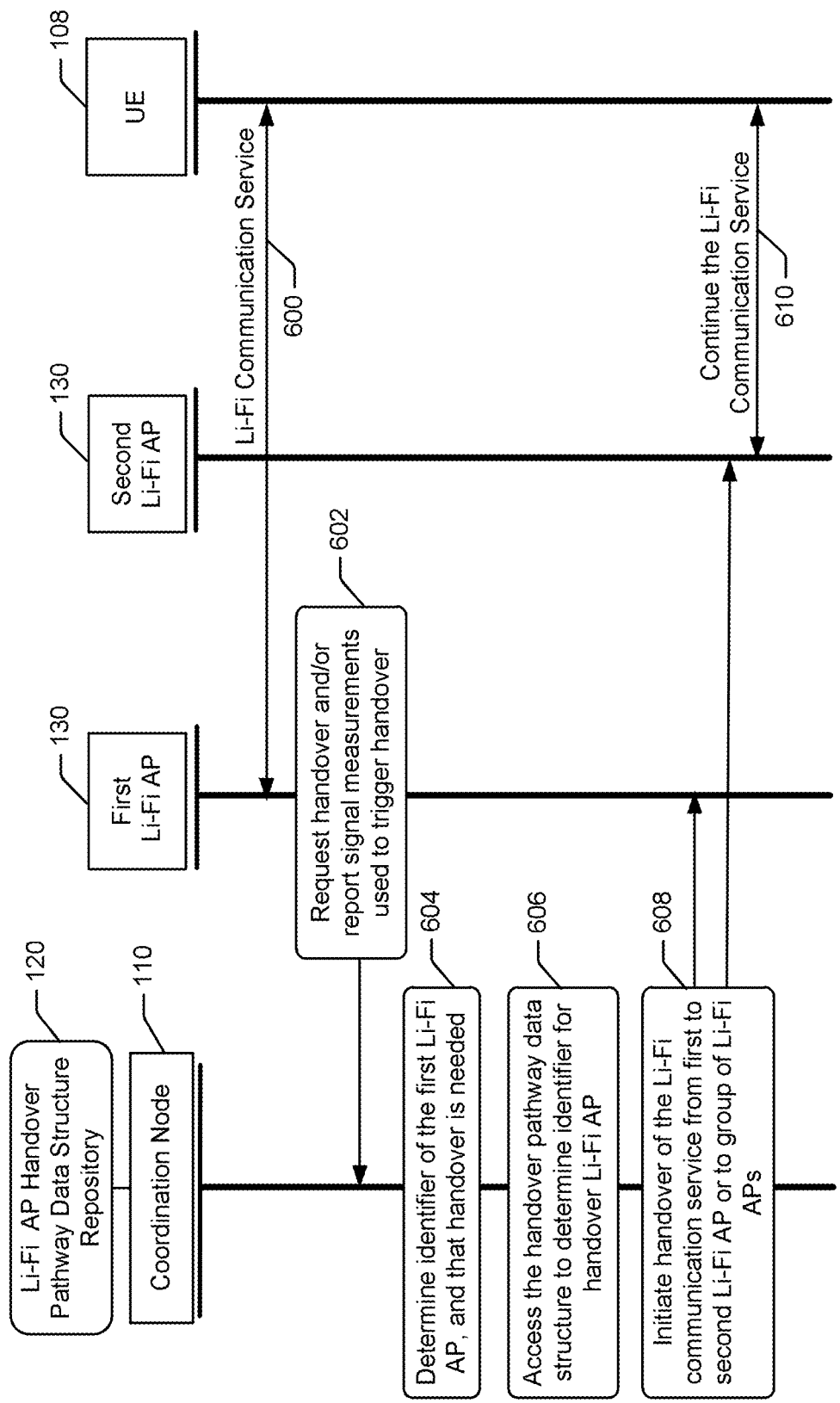
FIG. 6 is a combined data flow diagram and flowchart of further operations by the coordination node, the two Li-Fi APs, and the UE of FIG. 5 to perform handover of the UE using the handover pathway data structure in accordance with some embodiments of the present disclosure.
Figure 7:
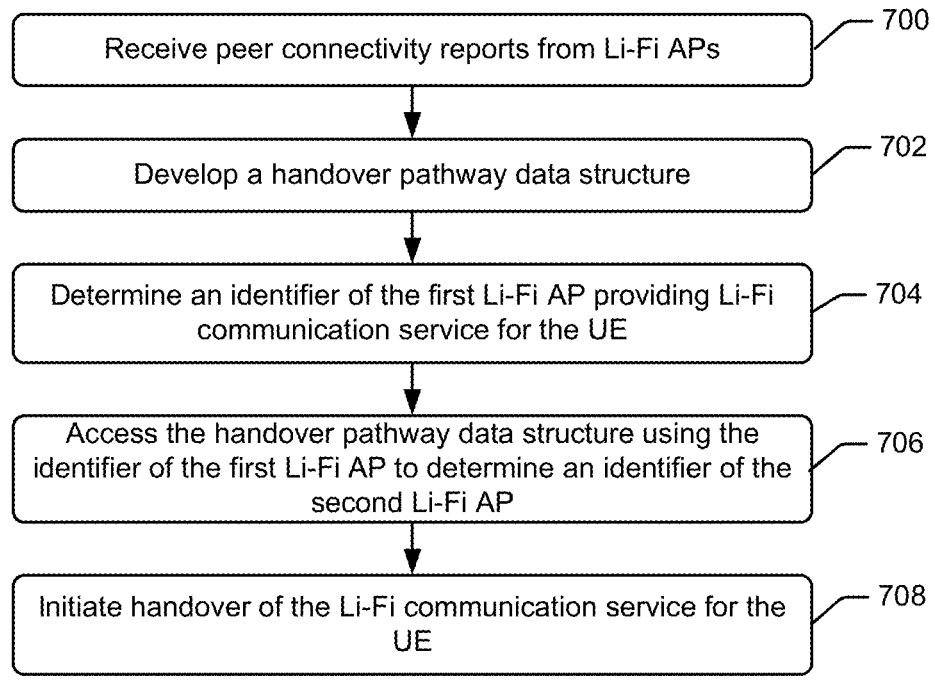
FIG. 7 is a flowchart of operations and methods by a coordination node to control the initiation of handover between Li-Fi APs and UEs in accordance with some embodiments of the present disclosure.

FIG. 5 is a combined data flow diagram and flowchart of operations by two Li-Fi APs (first and second Li-Fi APs) to provide peer connectivity reports to the coordination node 110 for development of a handover pathway data structure in accordance with some embodiments of the present disclosure. FIG. 6 is a combined data flow diagram and flowchart of further operations by the coordination node 110, the first and second Li-Fi APs, and the UE 108 of FIG. 5 to perform handover of the UE 108 using the handover pathway data structure in accordance with some embodiments of the present disclosure. FIG. 7 is a flowchart of operations and methods by the coordination node 110 to control the initiation of handover between Li-Fi APs 130 and UEs 108 in accordance with some embodiments of the present disclosure. FIGS. 8-11 are flowcharts of operations and methods by the Li-Fi APs 130 to generate peer connectivity reports that are sent to the coordination node 110 in accordance with some embodiments of the present disclosure.

Figure 8:
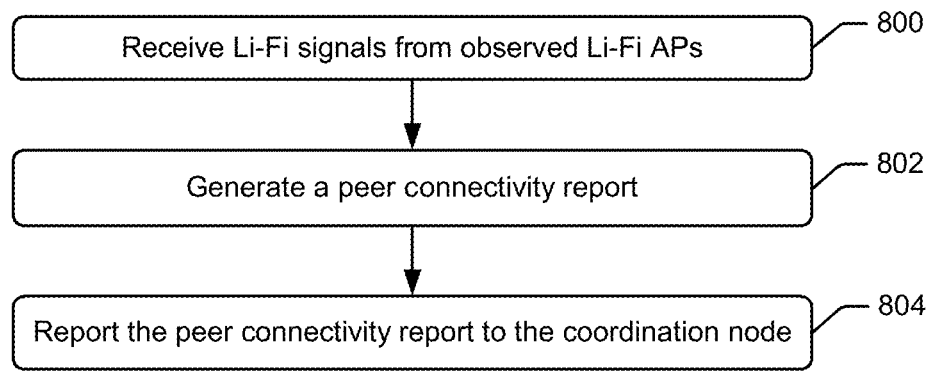
FIGS. 8-11 are flowcharts of operations and methods by a Li-Fi AP to generate peer connectivity reports that are sent to a coordination node in accordance with some embodiments of the present disclosure.
Figure 9:
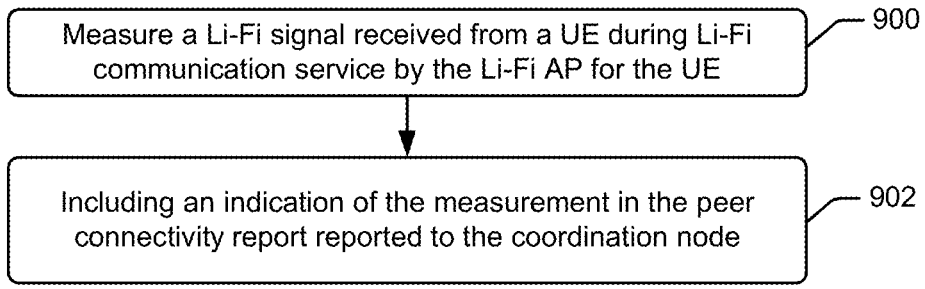

Various operations that can be performed by the Li-Fi APs 130 to generate peer connectivity reports for communication to the coordination node 110, and by the coordination node 110 to develop a handover pathway data structure therefrom are now explained in the context of FIGS. 5 and 8. The second Li-Fi AP 130 receives (block 500 of FIG. 5, block 800 of FIG. 8) a Li-Fi signal from the first Li-Fi AP 130. The Li-Fi signal provides an identifier of the first Li-Fi AP 130. The second Li-Fi AP 130 generates (block 802) a peer connectivity report containing an identifier of the Li-Fi AP 130 and the identifier of the first Li-Fi APs 130. When the second Li-Fi AP 130 receives Li-Fi signals from other observable Li-Fi APs 130, it generates the peer connectivity report to further contain identifiers of each of the observable Li-Fi APs 130. The second Li-Fi APs 130 reports (blocks 502 and 804) the peer connectivity report to the coordination node 110. The operations of second Li-Fi AP 130 within dashed box 510 can be similarly performed by the first Li-Fi AP 130 responsive to Li-Fi signals received from the second Li-Fi AP 130 and any other observable Li-Fi APs 130, to communicate a peer connectivity report to the coordination node 110.

The coordination node 110 uses the received peer connectivity reports to develop (block 504) a handover pathway data structure. Example operations that may be performed by the coordination node 110 to develop the handover data structure are shown in FIG. 7. With further reference to FIG. 7, the coordination node 110 receives (blocks 502 and 700) peer connectivity reports from Li-Fi APs 130 which identify Li-Fi APs having at least partially overlapping coverage areas, i.e., based on the Li-Fi APs receiving signals from other Li-Fi APs. The coordination node 110 develops (blocks 504 and 702) the handover pathway data structure, based on the peer connectivity reports, that identifies Li-Fi APs 130 that can receive communication handover from other identified Li-Fi APs 130. The coordination node 110 may store the handover pathway data structure in memory of the repository 120.

In one embodiment, operations to develop (blocks 504 and 702) the handover pathway data structure, include determining an identifier of a reporting Li-Fi AP 130 (i.e., the first Li-Fi AP) that reported one of the peer connectivity reports to the coordination node 110, determining an identifier of one or more observed Li-Fi APs 130 (i.e., the second Li-Fi AP) based on content of the one of the peer connectivity reports, and storing in the handover pathway data structure the identifier of the one or more observed Li-Fi APs 130 (i.e., the second Li-Fi AP) with a logical association to the identifier of the reporting Li-Fi AP 130 (i.e., the first Li-Fi AP). Operations to determine (blocks 604 and 704) an identifier of a first Li-Fi AP 130 providing Li-Fi communication service for the UE 108, can include receiving (e.g., signaling 600 in FIG. 6) a report containing a measurement by the UE 108 of a Li-Fi signal transmitted by the first Li-Fi AP 130, and responsive to determining that the measurement does not satisfy a signal quality threshold, performing the initiating handover (blocks 608 and 708) of the Li-Fi communication service for the UE 108 from the first Li-Fi AP 130 to the second Li-Fi AP 130.

The coordination node 110 may receive Li-Fi signal measurements reported by the Li-Fi APs 130, and use the signal measurements to determine whether to update the handover pathway data structure based on the Li-Fi APs 130 identified in the reports. For example, when a peer connectivity report from the first Li-Fi AP 130 contains a measurement of a signal received from the second Li-Fi AP 130 that is determined to be less than a signal quality threshold, the coordination node 110 may choose not to add the second Li-Fi AP 130 to the handover pathway data structure since it should not be an allowable candidate for handover from the first Li-Fi AP 130. Moreover, when the handover pathway data structure presently lists the second Li-Fi AP 130 as an allowable candidate for handover from the first Li-Fi AP 130 and the received signal measurement is less than the signal quality threshold, the coordination node 110 may remove the second Li-Fi AP 130 from the listing associated with the first Li-Fi AP 130 since it should no longer be an allowable candidate for handover from the first Li-Fi AP 130.

Related illustrative operations can include generating the peer connectivity reports to contain pairs of an identifier of one of the one or more observed Li-Fi APs 130 and a measurement by the reporting Li-Fi AP 130 of a Li-Fi signal received from the one of the one or more observed Li-Fi APs 130. Referring to the operations shown in FIG. 11, a Li-Fi AP 130 measures (block 1100) the Li-Fi signals received from observed Li-Fi APs 130, and generates (block 1102) a peer connectivity report to contain the measurements with defined associations to the identifiers of the observed Li-Fi APs 130.

The coordination node 110 can selectively perform storing in the handover pathway data structure of the identifier of the observed Li-Fi AP 130 with a logical association to the identifier of the reporting Li-Fi AP 130, only if the measurement by the reporting Li-Fi AP 130 of the Li-Fi signal received from the one of the one or more observed Li-Fi APs 130 satisfies a signal quality threshold.

The handover pathway data structure may be selectively updated only if the received signal measurement indicates that a signal strength threshold is satisfied and/or that a bit error rate threshold is satisfied. In one further embodiment, the identifier of the one of the one or more observed Li-Fi APs 130 is selectively stored in the handover pathway data structure with a logical association to the identifier of the reporting Li-Fi AP 130, only if a signal strength indicated by the measurement satisfies a signal strength threshold. In an alternative or additional further embodiment, the identifier of the one of the one or more observed Li-Fi APs 130 is selectively stored in the handover pathway data structure with a logical association to the identifier of the reporting Li-Fi AP 130, only if a bit error rate indicated by the measurement satisfies a bit error rate threshold.

The signal measurements reported by a Li-Fi AP 130 can be used to select a particular Li-Fi AP 130 from among a group of candidate Li-Fi APs 130 for use in initiating handover. At least some of the peer connectivity reports received by the coronation node 110 can contain pairs of an identifier of an observed Li-Fi APs 130 and a measurement by the reporting Li-Fi AP 130 of a Li-Fi signal received from the observed Li-Fi APs 130. The coordination node 110 can store the pairs in the handover pathway data structure with a logical association to the identifier of the reporting Li-Fi AP 130. The coordination node's 110 access (blocks 606 and 706) of the handover pathway data structure using the identifier of the first Li-Fi AP 130 can therefore identify a plurality of candidate Li-Fi APs 130. The coordination node 110 can select the second Li-Fi AP 130 from among the candidate Li-Fi APs 130 based on comparison of the measurements associated with the candidate Li-Fi APs 130 which are retrieved from the handover pathway data structure.

The coordination node 110 can further update the handover pathway data structure to remove a particular Li-Fi AP 130 from being associated with a reporting Li-Fi AP 130 when it becomes absent for threshold elapsed time from peer connectivity reports received from the reporting Li-Fi AP 130. Accordingly, the operations performed by the coordination node 110 to develop (blocks 504 and 702) the handover pathway data structure can include the following operations. Subsequent to storing an identifier of an observed Li-Fi AP with a logical association to an identifier of a reporting Li-Fi AP in the handover pathway data structure, the coordination node 110 can determine that an absentee one of the observed Li-Fi APs 130 has not been identified in a peer connectivity report received from the reporting Li-Fi AP 130 in at least a threshold elapsed time. The coordination node can responsively remove from the handover pathway data structure the identifier of the absentee one of the observed Li-Fi APs 130 and its logical association to the identifier of the reporting Li-Fi AP 130.

Corresponding operations by a Li-Fi AP 130 and include subsequent to a reporting of the peer connectivity report to the coordination node 110, determining that a Li-Fi signal has not been received from one of the observed Li-Fi APs 130 contained in the peer connectivity report in at least a threshold elapsed time, and excluding the one of the observed Li-Fi APs 130 from another peer connectivity report that is next reported to the coordination node 110 responsive to the determination. Thus, the Li-Fi AP 130 can selectively include identifiers for various previously observed Li-Fi APs 130 depending upon whether the Li-Fi AP 130 has received a Li-Fi signal therefrom within the threshold elapsed time.

Responsive to a determination that handover of Li-Fi communication service for the UE 108 is needed or responsive to another defined event, the coordination node 110 determines (block 704) an identifier of the first Li-Fi AP 130 providing Li-Fi communication service for the UE 108, and accesses (block 706) the handover pathway data structure using the identifier of the first Li-Fi AP 130 to determine an identifier of a second Li-Fi AP 130 to which handover from the first Li-Fi AP 130 can be performed. The coordination node 110 then initiates handover (block 708) of the Li-Fi communication service for the UE 108 from the first Li-Fi AP 130 to the second Li-Fi AP 130.

A potential advantage of this approach is that it can provide more efficient and robust management of handover of UE communications between Li-Fi APs 130. The coordination node 110 can use the peer connectivity reports from the Li-Fi APs 130 to dynamically update a handover pathway data structure to track changes in the handover opportunities between particular ones of the Li-Fi APs 130, such as when doors become open or closed, when Li-Fi APs 130 become powered on or power off, and/or when other events occur that change the communication capability of one or more of the Li-Fi APs 130. In view of the relatively small coverage areas provided by individual ones of the Li-Fi APs, developing and using a handover pathway data structure as disclosed herein can enable handover decisions to be quickly made based on the current availability of Li-Fi APs for handover from particular other Li-Fi APs.

Further operations that can be performed by the Li-Fi APs 130 and the coordination node 110 to trigger and perform handover, are now described in the context of FIGS. 6 and 9-11.

In the operational scenario of FIG. 5, the first Li-Fi AP 130 is providing Li-Fi communication service to the UE 108. The first Li-Fi AP 130 may perform signal measurements on Li-Fi signals received from the UE 108 and/or may receive signal measurements performed by the UE 108 on Li-Fi signals received from the first Li-Fi AP 130 and/or other identified Li-Fi APs, such as the second Li-Fi AP 130.

In some embodiments, handover decisions are performed by the coordination node 110 using signal measurements reported by the various Li-Fi APs 130. In the example operations of FIG. 6, the first Li-Fi AP 130 can report (block 602) signal measurements to the coordination node 110. The signal measurements may be performed by the first Li-Fi AP 130 and/or by the UE 108. According to the operational embodiment of FIG. 9, the first Li-Fi AP 130 measures (block 900) a Li-Fi signal received from the UE (108) during Li-Fi communication service by the first Li-Fi AP 130 for the UE (108), and includes (block 902) an indication of the measurement in the peer connectivity report reported to the coordination node 110. Alternatively or additionally, the first Li-Fi AP 130 receives (block 602) from the UE 108 measurements by the UE 108 of Li-Fi signals transmitted by the first Li-Fi AP 130 and/or received from other Li-Fi APs 130, such as from the second Li-Fi AP 130. The first Li-Fi AP 130 responsively reports (blocks 502, 602, 804) an indication of the measurements in the peer connectivity report. The measurements may alternatively or additionally be communicated in reporting messages that are separate from the peer connectivity reports.

In some other embodiments, handover decisions are performed by the Li-Fi APs 130 using signal measurements received from UEs 108 and/or using signal measurements they perform on Li-Fi signals received from UEs 108. In the embodiment of FIG. 6, the first Li-Fi AP 130 compares signal measurements, received from a UE 108 and/or performed on Li-Fi signals received from the UE 108, to a signal quality threshold. Responsive to the signal measurement not satisfying the signal quality threshold, the first Li-Fi AP 130 sends a handover request message to the coordination node 110, where the handover request message contains an identifier of the first Li-Fi AP may further contain an identifier of the UE 108.

The coordination node 110 determines (blocks 604 of FIG. 6 and 704 of FIG. 7) an identifier of the first Li-Fi AP 130 providing Li-Fi communication service for the UE 108. The coordination node 110 may determine (blocks 604 and 704) the identifier of the first Li-Fi AP 130 by operations that include parsing the handover request message received from the first Li-Fi AP 130 to determine the identifier of the first Li-Fi AP 130.

The coordination node 110 accesses (blocks 606 and 706) the handover pathway data structure using the identifier of the first Li-Fi AP 130 to determine an identifier of a second Li-Fi AP 130 to which handover from the first Li-Fi AP 130 can be performed, and initiates handover (blocks 608 and 708) of the Li-Fi communication service for the UE 108 from the first Li-Fi AP 130 to the second Li-Fi AP 130 that is identified. The second Li-Fi AP 130 subsequently operates to provide (block 610) Li-Fi communication service for the UE 108, and which may or may not be performed without interruption of a flow of data packets to the UE 108.

Operations by the coordination node 110 to initiate handover (blocks 608 and 708) can include initiating re-routing of data packets that are addressed to the UE 108, to be directed to the second Li-Fi AP 130 instead of to the first Li-Fi AP 130. Such data packet rerouting may be initiated by the coordination node 110 sending instructions to the LAN switch 140. Alternative or additional operations by the coordination node 110 to initiate handover can include sending a handover message to the first Li-Fi AP 130 that contains both the address of the UE 108 and the identifier of the second Li-Fi AP 130 to which the handover is being performed.

Figure 10:
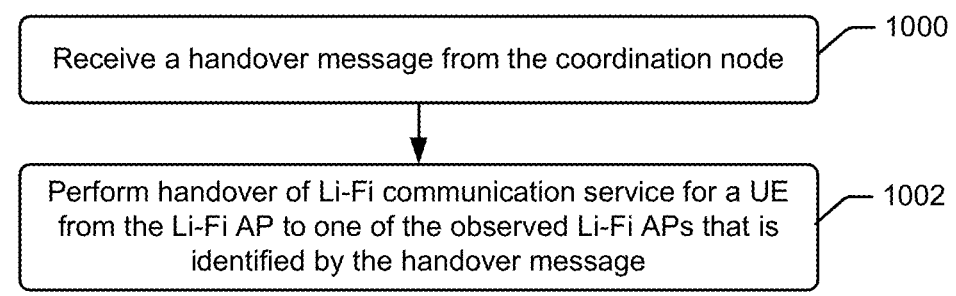
Figure 11:
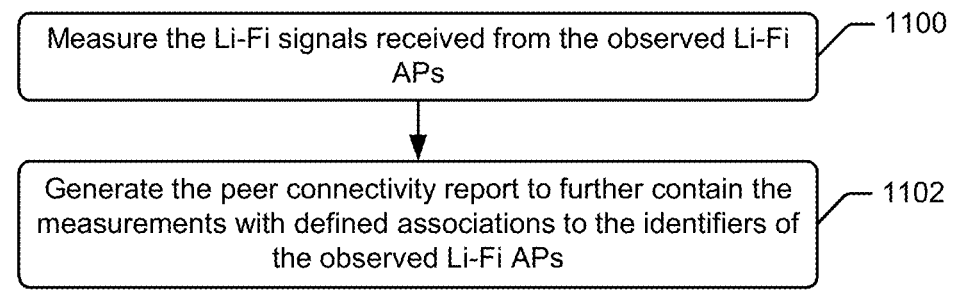

Operations by the first Li-Fi AP 130 for performing handover according to one embodiment is shown in FIG. 10. The first Li-Fi AP 130 receives (block 1000) the handover message, and responsively performs (block 1002) handover of the Li-Fi communication service for the identified UE 108 from the first Li-Fi AP 130 to the second Li-Fi AP 130 that is identified in the handover message. In still another embodiment, the first Li-Fi AP 130 can receive the handover message, and responsively forward the handover message to the UE 108 to trigger the UE 108 to initiate handover of the Li-Fi communication service from the first Li-Fi AP 130 to the second Li-Fi AP 130.

Although various embodiments have been explained in which the coordination node 110 directly controls operation of the first and second Li-Fi APs 130, in some other embodiments the coordination node 110 operates to coordinate negotiations between the Li-Fi APs 130. The coordination node 110 may operate to coordinate negotiations between the first and second Li-Fi APs 130 to perform the handover of the Li-Fi communication service for the UE 108. Accordingly, decentralized handover decision-making can be performed by the various Li-Fi APs 130 instead of via centralized handover decision-making by the coordination node 110. The ordination node 110 may communicate handover related information, obtained from its accessing (blocks 606 and 706) of the handover pathway data structure, to the first Li-Fi AP 130 and/or the second Li-Fi AP 130 to enable their negotiation of handover of Li-Fi communication service for the UE 108. The negotiations may be performed using negotiation messaging that is communicated through the intervening coordination node 110 and/or that is communicated directly between the Li-Fi APs 130.

In a situation when the coordination node 110 does not identify a particular Li-Fi AP 130 from the handover pathway data structure that can be used for handover, the coordination node 110 may responsively initiate handover to a group of Li-Fi APs 130. In one embodiment, responsive to the accessing (blocks 606 and 706) of the handover pathway data structure resulting in return of no identifier of another Li-Fi AP 130 as having been defined as associated with the identifier of the first Li-Fi AP 130, the coordination node 110 initiates handover (blocks 608 and 708) of the Li-Fi communication service for the UE 108 from the first Li-Fi AP 130 to a group of Li-Fi APs 130 at least one of which that is likely to have a coverage area that includes the UE 108. For example, the coordination node 110 may be configured to initiate re-routing of data packets for the UE 108 to all Li-Fi APs within a defined graphic area of the first Li-Fi AP 130, such as all Li-Fi APs have been defined to be proximately located to the first Li-Fi AP 130. For example, as explained above regarding FIG. 3b, when a UE being serviced by Li-Fi AP (A) is carried away from that service area, the coordination node 110 may responsively initiate handover of communication service for the UE to a group of Li-Fi APs (B), (C), and (D).

Figure 12:
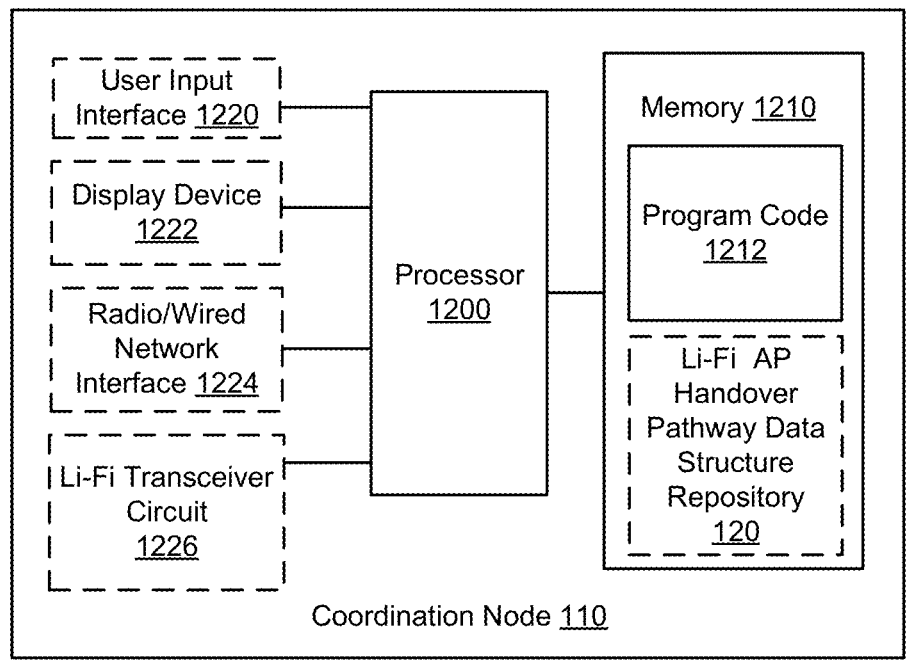
FIG. 12 is a block diagram of a coordination node that is configured according to some embodiments of the present disclosure.

FIG. 12 is a block diagram of the coordination node 110 that is configured according to some embodiments of the present disclosure. The coordination node 110 includes a processor 1200, a memory 1210, and a network interface circuit which may include Li-Fi network transceiver circuit 1226, and/or may include a radio and/or wired network interface 1224 (e.g., Ethernet interface). The radio network interface 1224 can include, but is not limited to, a LTE or other cellular transceiver, WiFi transceiver (IEEE 802.11), Bluetooth, WiMax transceiver, or other wireless communication transceiver configured to communicate with the Li-Fi APs 130.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code 1212 in the memory 1210, described below as a non-transitory computer readable medium, to perform at least some of the operations described herein as being performed by a coordination node. The memory 1210 may further include the Li-Fi AP handover pathway data structure repository 120. The coordination node 110 may further include a user input interface 1220 (e.g., touch screen, keyboard, keypad, etc.) and a display device 1222.

Figure 13:
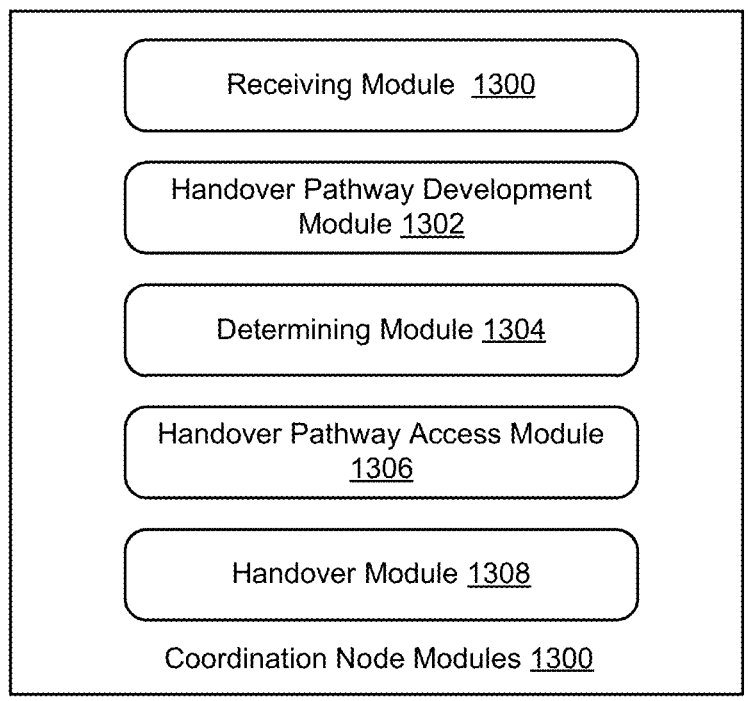
FIG. 13 is a block diagram of modules forming a coordination node that are configured according to some embodiments of the present disclosure.

FIG. 13 is a block diagram of modules 1300 forming a coordination node that is configured according to some embodiments of the present disclosure. Referring to FIG. 13, the modules 1300 include a receiving module 1300, a handover pathway development module 1302, a determining module 1304, a handover pathway access module 1306, and a handover module 1308. The receiving module 1300 is for receiving (block 502 and 700) peer connectivity reports from Li-Fi APs 130 which identify Li-Fi APs having at least partially overlapping coverage areas. The handover pathway development module 1302 is for developing (blocks 504 and 702) a handover pathway data structure, based on the peer connectivity reports, that identifies Li-Fi APs 130 that can receive communication handover from other identified Li-Fi APs 130. The determining module 1304 is for determining (blocks 604 and 704) an identifier of a first Li-Fi AP 130 providing Li-Fi communication service for a UE 108. The handover pathway access module 1306 is for accessing (blocks 606 and 706) the handover pathway data structure using the identifier of the first Li-Fi AP 130 to determine an identifier of a second Li-Fi AP 130. The handover module 1308 is for initiating handover (blocks 608 and 708) of the Li-Fi communication service for the UE 108 from the first Li-Fi AP 130 to the second Li-Fi AP 130.

Figure 14:
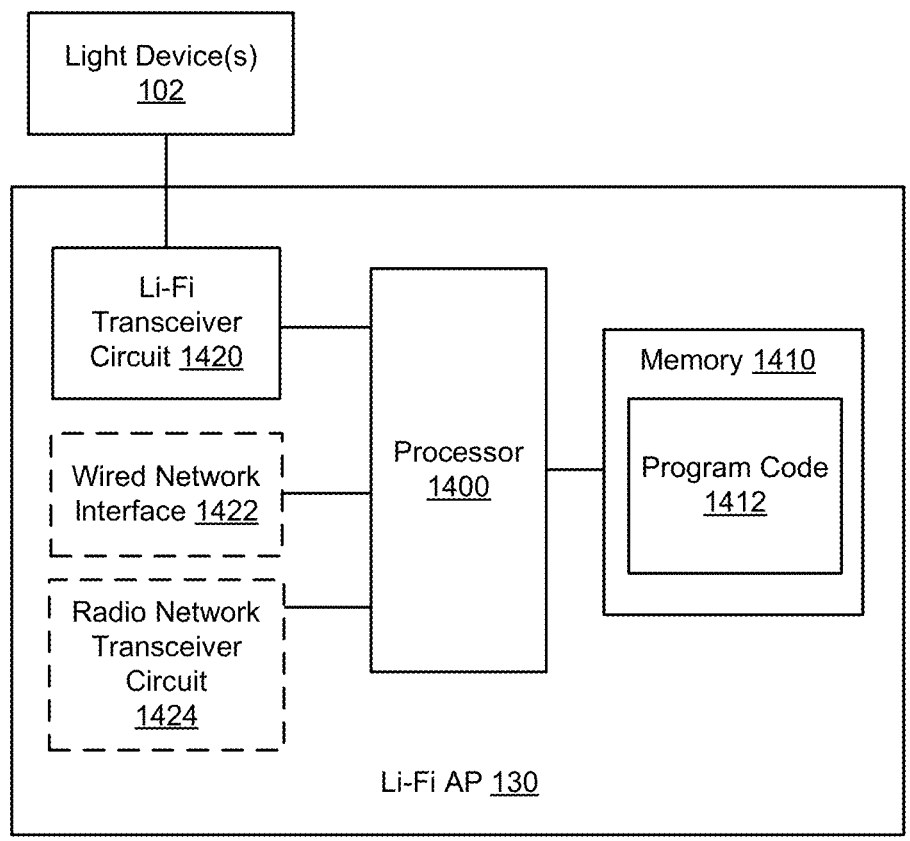
FIG. 14 is a block diagram of a Li-Fi AP that is configured according to some embodiments of the present disclosure.

FIG. 14 is a block diagram of a Li-Fi AP 130 that is configured according to some embodiments of the present disclosure. The Li-Fi AP 130 includes a processor 1400, a memory 1410, a Li-Fi transceiver circuit 1420, and may further include a wired network interface 1422 (e.g., Ethernet) and/or a radio network transceiver circuit 1424. The Li-Fi transceiver circuit 1420 is configured to communicate with UEs 108 according to or more embodiments herein. The radio network transceiver circuit 1424 can include, but is not limited to, a LTE or other cellular transceiver, WIFI transceiver (IEEE 802.11), Bluetooth, WiMax transceiver, or other wireless communication transceiver configured to communicate with the coordination node 110.

The processor 1400 may include one or more data processing circuits, such as a general purpose and/or special purpose processor (e.g., microprocessor and/or digital signal processor) that may be collocated or distributed across one or more networks. The processor 1400 is configured to execute computer program code 1412 in the memory 1410, described below as a non-transitory computer readable medium, to perform at least some of the operations described herein as being performed by a Li-Fi AP.

Figure 15:
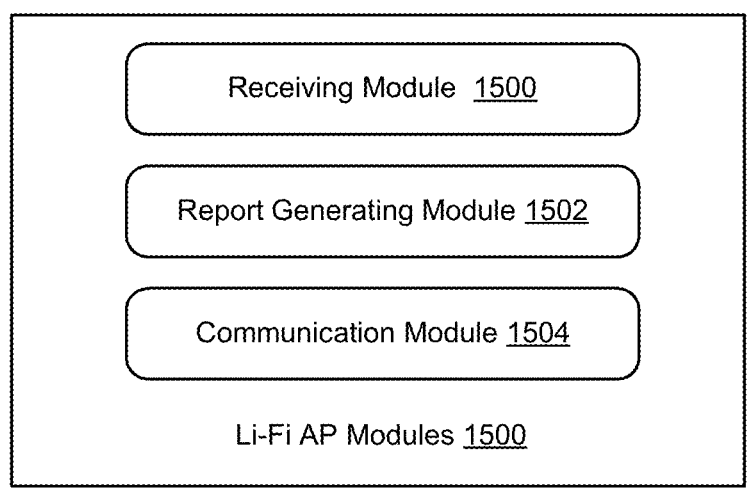
FIG. 15 is a block diagram of modules forming a Li-Fi AP that are configured according to some embodiments of the present disclosure.

FIG. 15 is a block diagram of modules 1300 forming a Li-Fi AP that is configured according to some embodiments of the present disclosure. Referring to FIG. 15, the modules 1500 include a receiving module 1500, a report generating module 1502, and a communication module 1504. The receiving module is for receiving (blocks 500 and 800) Li-Fi signals from observed Li-Fi APs 130, where the Li-Fi signals provide identifiers of the observed Li-Fi APs 130. The report generating module 1502 is for generating (block 802) a peer connectivity report containing an identifier of the Li-Fi AP 130 and the identifiers of the observed Li-Fi APs 130. The communication module 1504 is for reporting (blocks 502 and 804) the peer connectivity report to the coordination node (110).

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A coordination node for controlling communications between Light Fidelity, Li-Fi, Access Points, APs, and user equipments, UEs, the coordination node configured to perform operations to:
    obtain a handover pathway data structure that identifies Li-Fi APs that can receive communication handover from other identified Li-Fi APs;
    determine an identifier of a first Li-Fi AP providing Li-Fi communication service for a UE;
    access the handover pathway data structure using the identifier of the first Li-Fi AP to determine an identifier of a second Li-Fi AP to which handover from the first Li-Fi AP can be performed; and
    initiate handover of the Li-Fi communication service for the UE from the first Li-Fi AP to the second Li-Fi AP,
    wherein the operation to determine an identifier of a first Li-Fi AP providing Li-Fi communication service for a UE, comprises:
    receiving a report containing a measurement by the UE of a Li-Fi signal received from the first Li-Fi AP;
    responsive to determining that the measurement does not satisfy a signal quality threshold, performing the initiation of handover of the Li-Fi communication service for the UE from the first Li-Fi AP to the second Li-Fi AP.

2. The coordination node of claim 1, wherein the operation to obtain the handover pathway data structure comprises:
    receiving peer connectivity reports which identify Li-Fi APs having at least partially overlapping coverage areas; and
    developing the handover pathway data structure based on the peer connectivity reports.

3. The coordination node of claim 2, wherein the operation to develop the handover pathway data structure, comprises:
    determining an identifier of a reporting Li-Fi AP that reported one of the peer connectivity reports to the coordination node;
    determining an identifier of one or more observed Li-Fi APs by the reporting Li-Fi AP based on content of the one of the peer connectivity reports; and
    storing in the handover pathway data structure the identifier of the one or more observed Li-Fi APs with a logical association to the identifier of the reporting Li-Fi AP.

4. The coordination node of claim 3, wherein:
    the one of the peer connectivity reports contains pairs of an identifier of one of the one or more observed Li-Fi APs and a measurement by the reporting Li-Fi AP of a Li-Fi signal received from the one of the one or more observed Li-Fi APs; and
    the coordination node is further configured to perform operations to selectively perform the storing in the handover pathway data structure the identifier of the observed Li-Fi AP with a logical association to the identifier of the reporting Li-Fi AP, only if the measurement by the reporting Li-Fi AP of the Li-Fi signal received from the one of the one or more observed Li-Fi APs satisfies a signal quality threshold.

5. The coordination node of claim 4, wherein the identifier of the one or more observed Li-Fi APs is selectively stored in the handover pathway data structure with a logical association to the identifier of the reporting Li-Fi AP, only if a signal strength indicated by the measurement satisfies a signal strength threshold.

6. The coordination node of claim 4, wherein the identifier of the one of the one or more observed Li-Fi APs is selectively stored in the handover pathway data structure with a logical association to the identifier of the reporting Li-Fi AP, only if a bit error rate indicated by the measurement satisfies a bit error rate threshold.

7. The coordination node of claim 3, wherein:
the one of the peer connectivity reports contains pairs of an identifier of one of the one or more observed Li-Fi APs and a measurement by the reporting Li-Fi AP of a Li-Fi signal received from the one of the one or more observed Li-Fi APs, and the pairs are stored in the handover pathway data structure with a logical association to the identifier of the reporting Li-Fi AP; and
the coordination node is further configured responsive to when the accessing of the handover pathway data structure using the identifier of the first Li-Fi AP identifies a plurality of candidate Li-Fi APs, to select the second Li-Fi AP from among the candidate Li-Fi APs based on comparison of the measurements associated with the candidate Li-Fi APs which are retrieved from the handover pathway data structure.

8. The coordination node of claim 2, wherein the operation to develop the handover pathway data structure further comprises:
determine that an absentee one of the Li-Fi APs has not been identified in a peer connectivity report received from one of the Li-Fi APs in at least a threshold elapsed time; and
remove from the handover pathway data structure the identifier of the absentee one of the observed Li-Fi APs and its logical association to the identifier of the one of the Li-Fi APs.

9. The coordination node of claim 1, wherein the operation to determine the identifier of the first Li-Fi AP providing Li-Fi communication service for the UE, comprises parsing a handover request message received from the first Li-Fi AP to determine the identifier of the first Li-Fi AP.

10. The coordination node of claim 1, wherein the operation to initiate handover of the Li-Fi communication service for the UE from the first Li-Fi AP to the second Li-Fi AP, comprises:
initiate re-routing of data packets that are addressed to the UE, to be directed to the second Li-Fi AP instead of to the first Li-Fi AP.

11. The coordination node of claim 1, wherein the operation to initiate handover of the Li-Fi communication service for the UE from the first Li-Fi AP to the second Li-Fi AP, comprises:
coordinate negotiations between the first and second Li-Fi APs to perform the handover of the Li-Fi communication service for the UE.

12. The coordination node of claim 1 further configured to perform operations to:
responsive to an access of the handover pathway data structure resulting in return of no identifier of another Li-Fi AP as having been defined as associated with the identifier of the first Li-Fi AP, initiate handover of the Li-Fi communication service for the UE from the first Li-Fi AP to a group of Li-Fi APs at least one of which that is likely to have a coverage area that includes the UE.

13. A Light Fidelity, Li-Fi, Access Point, AP, for communicating with user equipments, UEs, under control of a coordination node, the Li-Fi AP configured to perform operations to:
receive Li-Fi signals from observed Li-Fi APs, the Li-Fi signals providing identifiers of the observed Li-Fi APs;
generate a peer connectivity report containing an identifier of the Li-Fi AP and an accumulated listing of the identifiers of the observed Li-Fi APs;
report the peer connectivity report containing the identifier of the Li-Fi AP and the accumulated listing of the identifiers of the observed Li-Fi APs to the coordination node;
receive from a UE measurements by the UE of a Li-Fi signal transmitted by the Li-Fi AP; and
send a handover request to the coordination node responsive to the measurement not satisfying a signal quality threshold.

14. The Li-Fi AP of claim 13, wherein the operations to generate the peer connectivity report comprises:
subsequent to the reporting of the peer connectivity report to the coordination node, determine that a Li-Fi signal has not been received from one of the observed Li-Fi APs contained in the peer connectivity report in at least a threshold elapsed time; and
excluding the one of the observed Li-Fi APs from an accumulated listing of observed Li-Fi APs in another peer connectivity report that is next reported to the coordination node responsive to the determination.

15. The Li-Fi AP of claim 13 further configured to:
receive from a UE measurements by the UE of Li-Fi signals transmitted by the Li-Fi AP and other Li-Fi APs; and
report an indication of the measurements in the peer connectivity report.

16. The Li-Fi AP of claim 13 further configured to:
measure a Li-Fi signal received from a UE during Li-Fi communication service by the Li-Fi AP for the UE; and
include an indication of the measurement in the peer connectivity report reported to the coordination node.

17. The Li-Fi AP of claim 13 further configured to:
receive a handover message from the coordination node; and
perform handover of Li-Fi communication service for a UE from the Li-Fi AP to one of the observed Li-Fi APs that is identified by the handover message.

18. The Li-Fi AP of claim 13 further configured to:
measure the Li-Fi signals received from the observed Li-Fi APs; and
generate the peer connectivity report to further contain the measurements with defined associations to the identifiers of the observed Li-Fi APs.

19. The Li-Fi AP of claim 13, wherein:
the Li-Fi AP is physically separate from the coordination node and communicates with the coordination node through a network interface.

* * * * *